Sept. 6, 1938.　　　　R. H. MONEY　　　　2,129,474
TEMPERATURE CONTROL FOR REFRIGERATORS
Filed Sept. 24, 1936
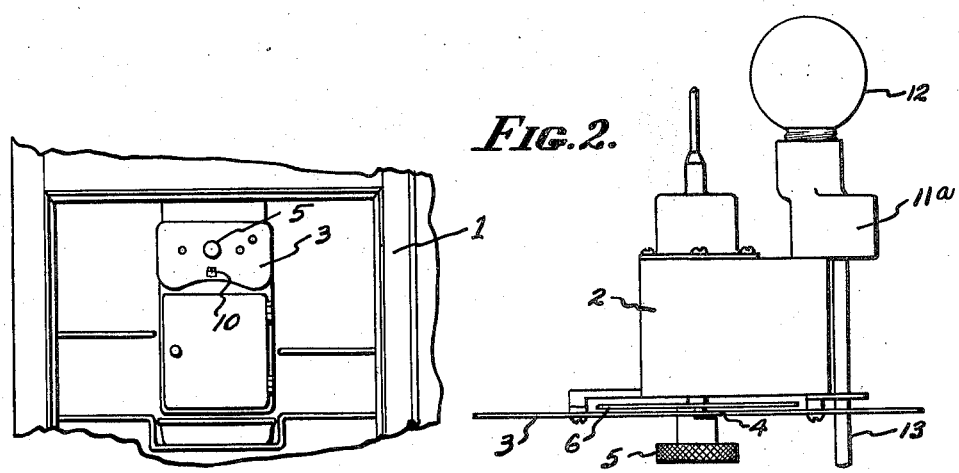
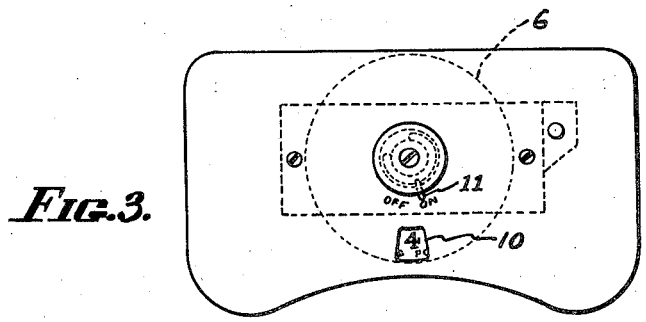
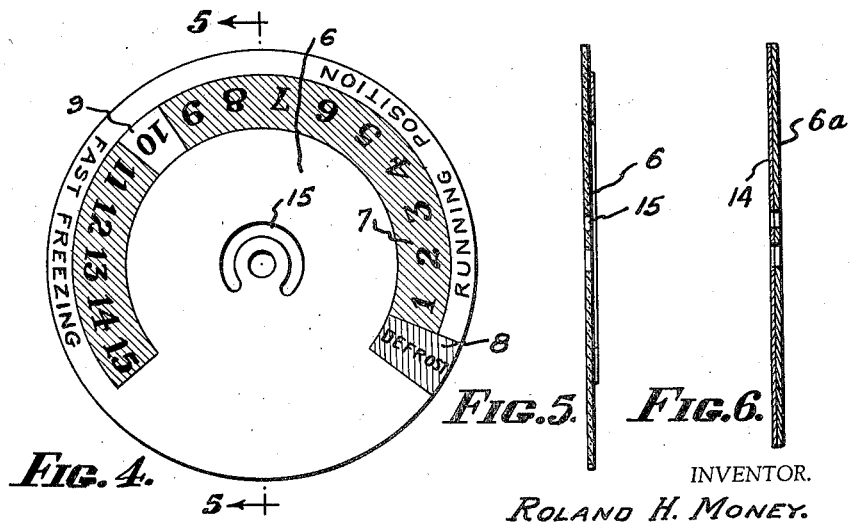
INVENTOR.
ROLAND H. MONEY.
BY
Allen & Allen
ATTORNEYS.

Patented Sept. 6, 1938

2,129,474

UNITED STATES PATENT OFFICE 2,129,474

TEMPERATURE CONTROL FOR REFRIGERATORS

Roland H. Money, Cincinnati, Ohio, assignor to The Crosley Radio Corporation, Cincinnati, Ohio, a corporation of Ohio Application September 24, 1936, Serial No. 102,373

4 Claims. (Cl. 62—1)

My invention relates to temperature controls for refrigerators and to improvements therein which facilitate the setting at a desired position.

The use of temperature controls on refrigerators has become quite common. The temperature controls have ordinarily been provided with knobs mounted on the front panel of the temperature control, which knob carries graduations which determine the various settings. Ordinarily an arrow or mark on the panel of the control has been employed to denote the desired setting of the knob, and arrows have indicated which direction the knob should be turned to induce more refrigeration and to bring about a cycle of de-frosting. Since the knobs have been small, the graduations have had to be very minute, as a result of which the housewife has found it difficult to utilize the control and to secure the efficiency in the refrigerating unit which should be possible.

The average housewife is familiar with the fact that her refrigerator has a temperature control on it, but that the control is utilizable for other than setting to de-frosting position, she rarely appreciates.

It is the object of my invention to provide a combination associated with the temperature control of a refrigerator by which adjustments of the temperature control will be greatly facilitated, and by which the position of the actuating shaft may be readily and accurately determined.

The above objects and other objects to which reference will be made in the ensuing description, I accomplish by that combination and arrangement of parts of which I have shown a preferred embodiment. Referring to the drawing:

Figure 1 is a fragmentary view of the front of a refrigerator showing the temperature control in position and the front door open.

Figure 2 is an enlarged detail plan view showing the temperature control assembly disassembled from the refrigerator frame.

Figure 3 is a front elevation of the temperature control assembly shown in Figure 2.

Figure 4 is a plan view of the illuminated graduated disc which forms a feature of my invention.

Figure 5 is a sectional view of the graduated disc taken along the lines 5—5 of Figure 4.

Figure 6 is a sectional view of a modified type of graduated disc.

The refrigerator frame is generally indicated at 1 and the temperature control consists of the actuating mechanism (which forms no part of my invention) encased within a housing 2, mounted on a panel 3 which panel fits within an opening in the front of the refrigerator casing and is secured in position therein.

The mechanism within the temperature control is actuated by a shaft 4 which carries a knurled knob 5. The graduations to determine the positions of the knob have in the past been carried on the hub of the knob, where they have ordinarily been so minute as to be perceptible with difficulty.

On the shaft 4 I provide a translucent disc 6 having graduations 7 arranged peripherally on the face of the disc. I have shown the disc with graduations from 1 to 15, which graduations I prefer to provide in a colored background such as the color green. This can be obtained by the insertion of green celluloid segments on the disc. I prefer to insert a red colored segment in the de-frosting position, as indicated at 8, and to facilitate the positioning of the temperature control in normal operating position, I insert a white segment as indicated at 9, to indicate normal operating speed.

The disc has an arcuate slot 15 through which a switch handle 11 turns the refrigerating unit on and off.

The graduations on the disc or dial 6 are observed in one position of rotary movement through an opening 10 in the temperature control panel. When the white number 10 shows in the opening 10, it indicates that the temperature control is set at normal operating speed. When the red de-frosting segment is visible through the opening 10, the temperature control is in de-frosting position. Notations on the outer circumference of the disc indicate running positions and fast freezing.

Mounted also on the panel of the temperature control I have shown an electric light case 11a carrying a light bulb 12, and a switch actuating shaft 13 turns the electric light switch on and off when the refrigerator door is opened and closed, by contact of the door with the end of the shaft 13.

In Fig. 6 I have shown a disc or a dial 6a of the same graduated construction as the dial 6 but instead of illumination by means of the electric light, I have mounted a disc or sheet 14 of light colored paper at the back of the transparent disc, which provides illumination. The paper sheet may carry the graduations and the disc 6a may be uni-colored, the various color graduations being provided by the paper disc.

It will be obvious that various materials may be used for making the discs and different arrangements for graduating the disc and for arranging the graduations will occur to others without departing from the scope of my invention.

Having thus described my invention, what I claim as new and desire to secure by Letters Patent, is:

1. In a temperature control for a mechanical refrigerator having an exposed front panel with a rotatable shaft extending through the panel which shaft actuates the temperature control and which shaft carries on its outer end a knob for manual manipulation of the shaft, a disc carrying peripheral graduations denoting the position of the temperature control mounted on said shaft and concealed by said panel, said panel having an opening with which the graduations register at a certain position of peripheral movement, and through which definite settings may be observed, an electric light associated with said temperature control and arranged with a switch to be turned on when the door of the refrigerator is opened, and said disc being translucent whereby the graduations are illuminated as observed through said panel opening.

2. In a temperature control for a mechanical refrigerator having an exposed front panel with a rotatable shaft extending through the panel which shaft actuates the temperature control and which shaft carries on its outer end a knob for manual manipulation of the shaft, a disc carrying peripheral graduations denoting the position of the temperature control mounted on said shaft and concealed by said panel, said panel having an opening with which the graduations register at a certain position of peripheral movement, and through which definite settings may be observed, an electric light associated with said temperature control and arranged with a switch to be turned on when the door of the refrigerator is opened, and said disc being translucent whereby the graduations are illuminated as observed through said panel opening, said disc having peripheral portions thereof colored differently whereby de-frosting and normal operating position may be readily observed.

3. In a temperature control for a mechanical refrigerator having an exposed front panel with a temperature control actuating shaft extending through the panel, a knob on said shaft, a disc carrying peripheral graduations mounted on said shaft and concealed by said panel, said panel having an opening with which the graduations register at a certain position of peripheral movement and through which definite settings may be observed, said disc being translucent, and means for illuminating said graduations, the graduated portions of the disc being colored differently to denote the variations of temperature control.

4. In a temperature control for a mechanical refrigerator having an exposed front panel with a temperature control actuating shaft extending through the panel, a knob on said shaft, a disc carrying peripheral graduations mounted on said shaft and concealed by said panel, said panel having an opening with which the graduations register at a certain position of peripheral movement and through which definite settings may be observed, said disc being translucent, and means for illuminating said graduations, comprising an electric light which illuminates the interior of the refrigerator.

ROLAND H. MONEY.